United States Patent [19]

Hara et al.

[11] Patent Number: 4,528,444
[45] Date of Patent: Jul. 9, 1985

[54] OPTICAL READING APPARATUS WITH AUTOMATIC GAIN CONTROL CIRCUIT

[75] Inventors: Masahiro Hara; Toshiyasu Sakai, both of Kariya, Japan

[73] Assignee: Nippondenso Co., Ltd., Kariya, Japan

[21] Appl. No.: 436,822

[22] Filed: Oct. 26, 1982

[30] Foreign Application Priority Data

Oct. 30, 1981 [JP] Japan .............................. 56-175069

[51] Int. Cl.³ .............................................. G06K 7/10
[52] U.S. Cl. ................................... 235/462; 235/463; 235/472
[58] Field of Search ................. 235/462, 463, 472, 464

[56] References Cited

U.S. PATENT DOCUMENTS

| | | | |
|---|---|---|---|
| 3,849,632 | 11/1974 | Eckert | 235/463 |
| 3,949,233 | 4/1976 | Gluck | 235/462 |
| 3,969,612 | 7/1976 | McJohnson | 235/462 |
| 4,114,030 | 9/1978 | Nojiri et al. | 235/464 |
| 4,219,152 | 8/1980 | Couch | 235/463 |
| 4,335,301 | 6/1982 | Palmer | 235/462 |
| 4,364,513 | 12/1982 | Tsuzuki | 236/49 |

*Primary Examiner*—Harold I. Pitts
*Attorney, Agent, or Firm*—Cushman, Darby & Cushman

[57] ABSTRACT

In an optical reading apparatus having a reading sensor for converting optically readable information into an electrical analog signal, an automatic gain control circuit is provided to maintain the amplitude of the electrical signal constant. The gain of the automatic gain control circuit is controlled such that the average or peak voltage of the electrical signal derived from the reading sensor is detected and held until next scanning effected by the reading sensor so that a variable impedance element included in the automatic gain control circuit will be controlled in accordance with the held voltage to maintain the amplitude of the electrical signal constant.

11 Claims, 11 Drawing Figures

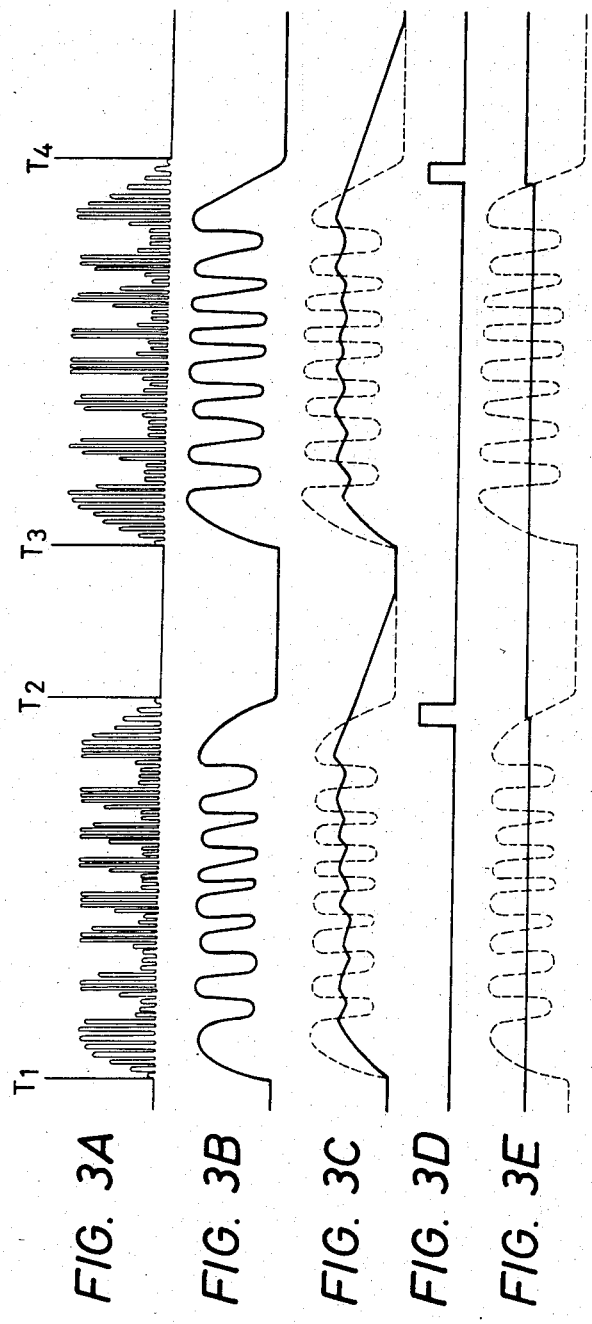

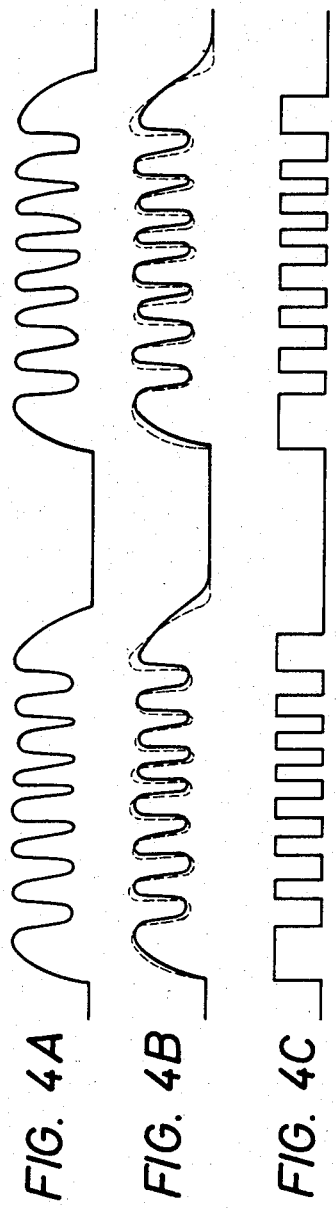
FIG. 4A
FIG. 4B
FIG. 4C
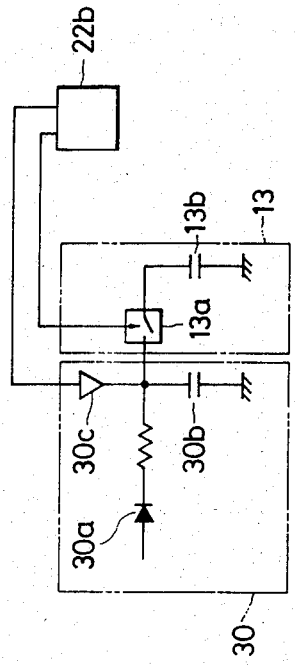
FIG. 5

OPTICAL READING APPARATUS WITH AUTOMATIC GAIN CONTROL CIRCUIT

BACKGROUND OF THE INVENTION

This invention relates generally to optical reading apparatus, such as a bar code reader, arranged to read coded information by a reading sensor of electronic scanning type.

When reading optically readable information such as a bar code printed on a bar code label, by means of a bar code reader, suitable light is incident on the label to detect reflected light, where the reflected light is transmitted through a lens to image the pattern of the bar code on a sensor which produces an electrical signal indicative of the information from the bar code. However, there are various kinds of recording media carrying optically readable information, such as bar codes. For instance, taking an example of bar code labels, it is to be noted that the reflection factor of bar code labels has a variation due to the difference in color, material or due to stain thereon. Since bar code readers detect the information of the bar code from the difference in reflection factor between dark (black) bars and light spaces (white bars), the amplitude of the output signal from the reading sensor used in the reader is small when the reflection factor is low. On the other hand, when reading a bar code printed on a high reflection factor label, the output signal exhibits a large amplitude. In this way, the output signal level changes due to the difference in reflection factor of the bar code labels, and therefore, this results in unstable reading because it is difficult to shape the waveform of an electrical signal whose amplitude varies throughout labels.

In addition, since bar code labels are illuminated by a light souce built in a bar code reader, the intensity of the reflected light changes when the intensity of the incident light changes. Furthermore, when external light is also incident on the label, the intensity of the reflected light is affected even if the intensity of the light from the built-in light source is kept constant. Especially, when a high-intensity external light is applied to the label, the output signal from an amplifier following the reading sensor is apt to be saturated resulting in unreadable condition.

SUMMARY OF THE INVENTION

The present invention has been developed in order to remove the above-described drawbacks inherent to the conventional optical reading apparatus.

It is, therefore, an object of the present invention to provide an optical reading apparatus with an automatic gain control circuit so that reading can be effected with a suitable gain irrespective of the change in the intensity of the reflected light.

According to a feature of the present invention a control voltage indicative of the amplitude of an electrical signal obtained as a result of scanning in a reading sensor is held in a holding means, and this information will be used to automatically control the amplification degree of an amplifier which follows the reading sensor.

BRIEF DESCRIPTION OF THE DRAWINGS

The object and features of the present invention will become more readily apparent from the following detailed description of the preferred embodiments taken in conjunction with the accompanying drawings in which:

FIGS. 3A to 3E are waveform charts useful for understanding the operation of the circuit of FIG. 2;

FIGS. 4A to 4C are waveform charts useful for understanding the operation of the circuit of FIG. 2; and FIG. 5 is a circuit diagram of a peak hold circuit which may be used in place of the integrator of FIG. 2.

The same or corresponding elements and parts are designated at like reference numerals throughout the drawings.

DETAILED DESCRIPTION OF THE INVENTION

Figure 1:
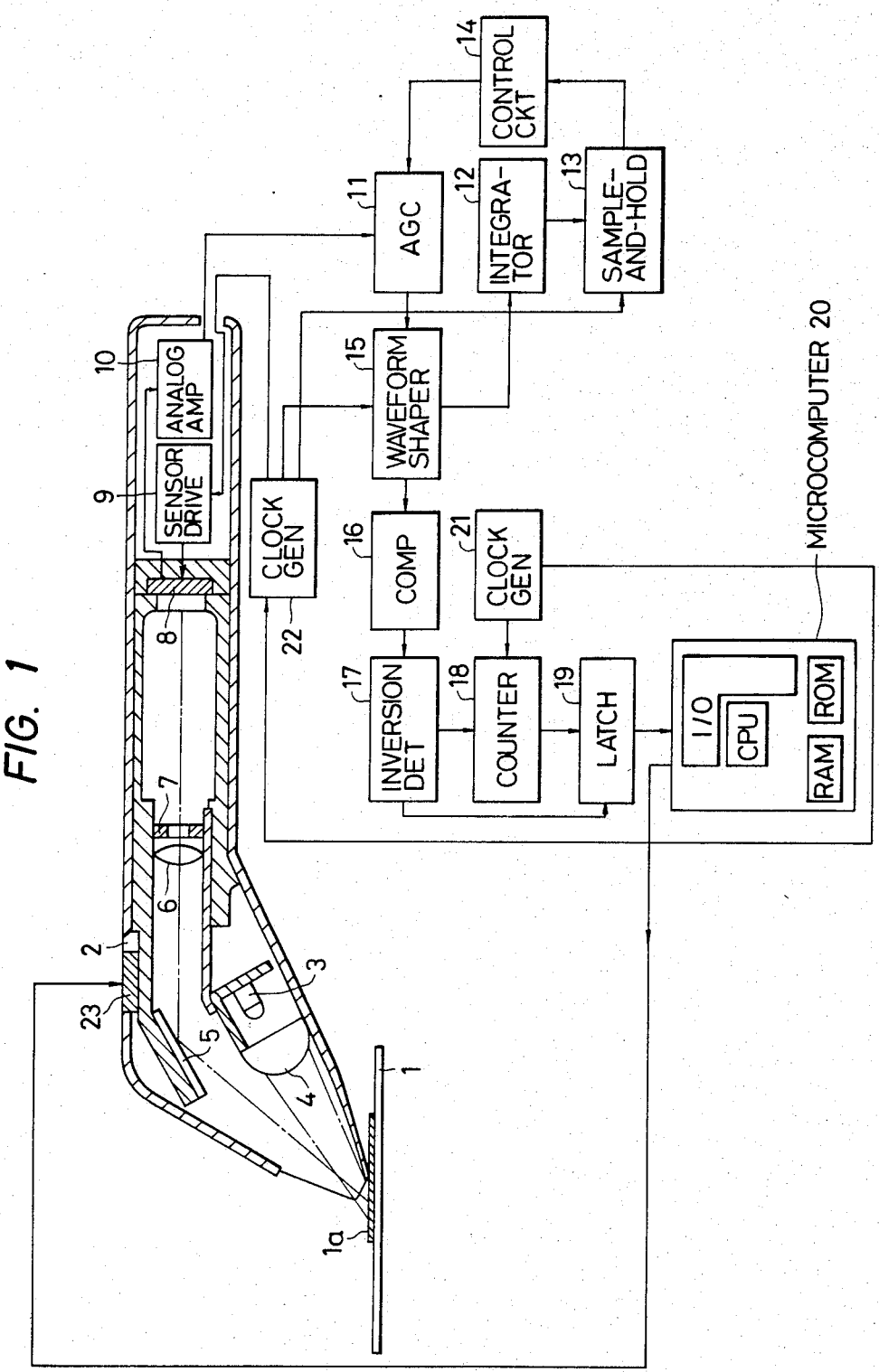
FIG. 1 is a schematic diagram of an embodiment of a bar code reader according to the present invention.

Referring now to FIG. 1, a schematic diagram of an embodiment of a bar code reader according to the present invention is shown. The reference 1 is a bar code label on which a bar code 1a having black bars and white bars (light spaces) is printed as a light and shade pattern. The reference 2 indicates a casing of a hand-held bar code reader. The bar code reader comprises within the casing 2 a light source 3 having a plurality of lamps for illuminating the bar code label 1, and a semi-cylindrical lens 4 for condensing the light from the light source 3 so that the light is incident on the bar code label 1 after being condensed. The reference 5 is a reflecting mirror used for reflecting reflected light from the bar code label 1 in a predetermined direction, i.e. a direction toward a reading sensor 8, and the reflected light from the reflecting mirror 5 is transmitted through a condenser lens 6 and a diaphragm member 7 having an elongate slit arranged so that its longitudinal direction is perpendicular to the reading direction which is normal to the parallel bars, to the reading sensor 8 where an image of the bar code 1a to be scanned is imaged thereon. The reading sensor 8 uses a one-dimensional image sensor which converts the image on the scanning line into an electrical signal by electronic scanning operation. A dot-dash line in FIG. 1 indicates the locus of light in the optical system. The reference 9 is a driving circuit for the reading sensor 8. Necessary clock pulses for driving the reading sensor 8 are produced by the driving circuit 9 by changing clock pulses from a clock generator 22, and are applied to the reading sensor 8.

The reference 10 is an analog amplifier which amplifies an electrical signal from the reading sensor 8, obtained by scanning. The reference 11 is an AGC (automatic gain control) circuit capable of automatically changing the amplification gain of the electrical signal obtained by the analog amplifier 10 in accordance with an average voltage or a peak voltage obtained on former scanning, so that a stable output can be obtained thereafter. The reference 15 is a waveform shaping circuit for shaping the waveform of the output signal from the AGC circuit 11, and this waveform shaping circuit 15 comprises a sample-and-hold circuit for converting the output signal into a continuous signal and a low pass filter for smoothing the output signal waveform. The reference 12 is an integrator for integrating the output signal from the waveform shaping circuit 15 in the case that gain control is effected with an average voltage. The average voltage from the integrator 12 is held by a sample-and-hold circuit 13 until subsequent scanning is completed. On the other hand, in the case that the amplification gain is controlled by the peak voltage, a peak voltage detector is provided in place of the integrator 12 so as to detect the peak value of the output signal from the AGC circuit 11 and this peak voltage will be held by the sample-and-hold circuit 13 until a subsequent scanning is completed. The reference 14 is a control circuit arranged to control the gain of the AGC circuit 14 to be suitable average or peak voltage. The reference 16 is a comparator for converting the waveform shaped signal from the waveform shaping circuit 15 into a binary signal having high and low levels respectively corresponding to the black and white bars. The reference 17 is an inversion detecting circuit, which sends a latch pulse and clear pulse retarded slightly from the latch pulse to a latch 19 and a counter 18 each time of inversion, i.e. the instants of rising and falling of the binary signal are detected. The reference 21 is a clock generator for generating a clock pulse train having a predetermined frequency. The counter 18 repeats counting the number of clock pulses each time it is cleared in response to the clear pulse from the inversion detecting circuit 17, and its count indicates a value corresponding to the width of each bar of the bar code 1a. The latch 19 stores therein the counts of the counter 18, i.e. the width of each bar, which is obtained just before the counter 18 is cleared. The clock generator 22 is responsive to the clock generator 21 so that the former produces a basic clock pulse train necessary for driving the reading sensor 8, and two timing clock pulse trains which are respectively necessary for the sample-and-hold circuit in the waveform shaping circuit 15 and for the sample-and-hold circuit 13.

A microcomputer 20 having a central processing unit (CPU), a random access memory (RAM), a read-only memory (ROM), and an input-output device (I/O) is proivided to decode the output information from the latch 19 so as to detect the width of each bar. A piezoelectric buzzer 23 is provided to the casing 1 of the hand-held bar code reader to inform the operator of the completion of reading. Namely, the piezo-electric buzzer 23 is responsive to an output signal from the microcomputer 20, which is emitted when the width of all the bars is detected.

The bar code reader operates as follows: In order to read a bar code 1a printed on the bar code label 1, the head portion of the hand-held bar code reader is directed at the bar code label 1 as shown in FIG. 1 with the light source 3 being energized. The light rays from the light source 3 is condensed by the lens 4 to illuminate the bar code label 1 so that the intensity of light reflected at black bars is lower than that of reflected light from white bars. The reflected light is transmitted through the reflecting mirror 5, the lens 6 and the diaphragm member 7 so that the pattern of the bar code 1a is imaged on a scanning line on the reading sensor 8. Since the elongate slit made in the diaphragm member 7 is perpendicular to the reading line, the focal depth is made sufficiently deep to avoide unfocussing, and a sufficient amount of light can pass therethrough to ensure accurate reading by the reading sensor 8.

The reading sensor 8 performs electronic scanning in receipt of a clock pulse signal from the driving circuit 9 so that the black and white bars imaged on the scanning line thereof are converted into corresponding electrical signals. The clock pulses from the driving circuit 9 are repeatedly fed to the reading sensor 8 so that electronic scanning is repeatedly effected until reading is completed. The output electrical signal from the reading sensor 8 is amplified by the analog amplifier 10, and then fed to the AGC circuit 11.

Figure 2:
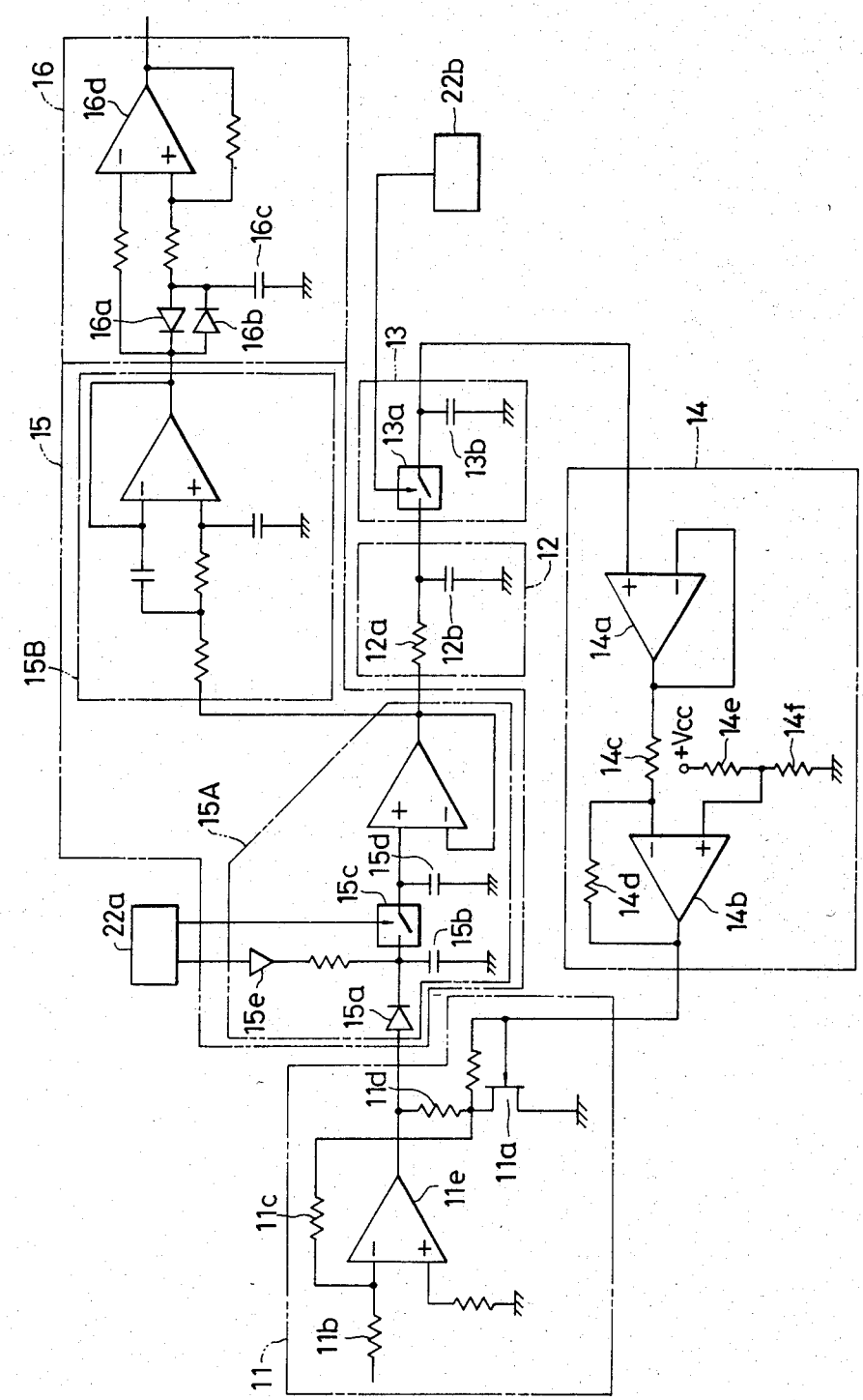
FIG. 2 is a circuit diagram of a main part of FIG. 1.

FIG. 2 is a circuit diagram of a main part of FIG. 1. Namely, the circuit diagram of FIG. 2 shows detailed circuit diagram of the AGC circuit 11, the waveform shaping circuit 15, the integrator 12, the sample-and-hold circuit circuit 13, the control circuit 14, and the comparator 16. In the AGC circuit 11, the reference 11a is an N-channel field effect transistor (FET), and the gate of the FET 11a is arranged to receive an output signal from the control circuit 14, where this output signal shows an inverted average voltage of the output signal from the reading sensor 8 obtained in former scanning as will be described later. In receipt of such a signal at the gate, the impedance between the drain and source of the FET 11a will be determined by the voltage at the gate. The output voltage of an operational amplifier 11e included in the AGC circuit 11 will be divided by a voltage divider comprising a resistor 11d and the drain-source path of the FET 11a, and this divided voltage is fed back via a resistor 11c to an inverting input terminal of the OP AMP 11e. Since the AGC circuit 11 has such a structure, the gain G thereof will be given by:

$$G = -\frac{R_2}{R_1} \cdot \frac{R_3 + (R_2//R_{SD})}{R_2/R_{SD}} \qquad (1)$$

$$= -\frac{R_2 + R_3 + (R_2 R_3//R_{SD})}{R_1}$$

wherein
$R_2//R_{SD} = R_2 \cdot R_{SD}/(R_2 + R_{SD})$;
$R_{SD}$ is the resistance between the drain and souce of the FET 11a;
$R_1$, $R_2$ and $R_3$ are resistances of the resistors 11b, 11c and 11d, respectively.

Assuming that the amplitude of the output signal obtained in former scanning becomes great, the average voltage thereof rises so that the voltage applied to the gate of the FET 11a increases in the negative direction, resulting in high impedance between the drain and souce thereof. Therefore, as will be understood from above Eq. (1), the gain G of the AGC circuit 11 lowers so that the amplitude of the output signal from the AGC circuit 11 is suppressed. On the other hand, if the amplitude of the output signal from the amplifier 10 becomes small, the average voltage thereof reduces so that the voltage applied to the gate of the FET 11a becomes small. Thus, the impedance between the drain and source of the FET 11a lowers to increase the gain G of the automatic gain cotrol circuit 11. Accordingly, the amplitude of the output signal from the AGC circuit 11 can be increased.

From the above it will be understood that the AGC circuit 11 provides an output signal having a constant amplitude even if the amplitude of the output signal from the amplifier 10 fluctuates for some reasons. The waveform of the output signal from the AGC circuit 11 is shown in FIG. 3A where the amplitude of the output signal is shown to be increased for some reasons.

The reference 22a is a sampling pulse generator included in the clock generator 22. Namely, the sampling pulse generator 22a produces a sampling pulse in receipt of a reference clock plulse signal from the clock generator 21. The reference 15A is a sample-and-hold circuit in which the output analog signal from the AGC circuit 11 is sampled to be discrete signals which are synchronized with the sampling pulses, and the discrete signals are converted into a continous signal. In detail, the analog output signal from the AGC circuit 11 is transmitted via a diode 15a to a capacitor 15b so that the peak value of the output signal is held by the capacitor 15b. An analog switch 15c performs on-off operation in response to the sampling pulse signal from the sampling pulse generator 22a so that the peak value stored in the capacitor 15b is intermittently transmitted to a capacitor 15d. Thus the peak voltage is transmitted to the capacitor 15d in which it is stored until an instant of subsequent sampling. The reference 15e is a buffer of open-collector type, which is adapted to discharge the capacitor 15b after the analog switch 15c opens with the voltage across the capacitor 15b being transmitted to the capacitor 15d, in synchronism with the sampling pulse so that the capacitor 15b is prepared to holding operation on next sampling.

The reference 15B is a low pass filter which extracts low frequency components from the output signal of the sample-and-hold circuit 15A. The cutoff frequency of the low pass filter 15B is set to a value which is lower than the frequency of the continuous signal corresponding to a wide bar of the bar code 1a, from the sample-and-hold circuit 15A. With the provision of the low pass filter 15B, noise components etc., are removed from the continuous signal. FIG. 3B shows the waveform of the continuous signal passed through the low pass filter 15B. The waveform shaping circuit 15 comprises the above-mentioned sample-and-hold circuit 15A and the low pass filter 15B.

The output signal from the low pass filter 15B of the waveform shaping circuit 15 is applied to the comparator 16 which converts the analog signal into a binary signal of high and low levels corresponding to the black bars and white bars. In the comparator 16, the references 16a and 16b are inverse-parallel connected diodes, 16c a capacitor, with both diodes and capacitor being connected to a noninverting input terminal of an operational amplifier 16d. Namely, the amplitude of the input signal is reduced by the forward voltage drop of the diodes 16a and 16b, while the phase of the input signal is shifted by the capacitor 16c to provide a reference signal for the comparison with the input signal. The operational amplifier 16d compares the output signal from the low pass filter 15B with the reference signal to obtain a binary signal at its output. The binary signal corresponding to the black and white bars is used to derive data indicative of the width of each bar in the following circuits shown in FIG. 1. Namely, the width of each pulse in the binary signal is measured by counting the number of clock pulses by the counter 18 so as to produce data indicative of the width of each bar. This data is read by the microcomputer 20 so that predetermined operation is executed to complete reading of the bar code 1a.

The integrator 12, which is employed for obtaining an average voltage as described hereinabove, is responsive to the output signal from the sample-and-hold circuit 15A. The integrator 12 comprises a resistor 12a and a capacitor 12b where the time constant thereby is determined so that an average voltage of its input voltage will be obtained at its output terminal. FIG. 3C shows the waveform of the output average voltage from the integrator 12 (see solid curve).

The reference 22b is a sampling pulse generator also included in the clock pulse generator 22 of FIG. 1. FIG. 3D shows the sampling pulse generated by the sampling pulse generator 22b, and this sampling pulse is fed to an analog switch 13a of a sample-and-hold circuit 13 which also has a capacitor 13b. The analog switch 13a performs on-off operation in response to the sampling pulse from the sampling pulse generator 22b so that the output signal from the integrator 12 is intermittently fed to the capacitor 13b. The timing of the sampling pulse for the analog switch 13a is arranged such that the average voltage from the integrator 12 is held in the capacitor 13b until next scanning is completed.

The control circuit 14 is responsive to the output signal from the sample-and-hold circuit 13 so that the aforementioned voltage fed to the gate of the FET 11a of the AGC circuit 11 will be controlled in accordance with the average voltage obtained on former scanning. In the control circuit 14, the reference 14a is a voltage follower which stably holds the above-mentioned sampled and held average voltage from the sample-and-hold circuit 13, and the reference 14b is an inverting amplifier which converts the average voltage from the voltage follower 14a into an appropriate voltage. In detail, the amplitude of the average voltage is limited by resistors 14c and 14d, while the center level of the same is controlled by resistors 14e and 14f. The output signal from the inverting amplifier 14b is fed to the gate of the FET 11a of the AGC circuit 11 so that the gain G of the AGC circuit 11 will be changed in accordance with the average voltage. The above-mentioned series of operations are repeated until scanning of the bar code is completed.

The operation of the circuit arrangement of FIG. 2 will be further described in detail with reference to the waveforms of FIGS. 3A to 3E. In FIG. 3A showing the output signal waveform from the AGC circuit 11, a duration between T1 and T2 indicates one scanning, and another duration between T3 and T4 a subsequent scanning effected by the reading sensor 8. The amplitude of this signal between T3 and T4 is shown to be increased from that between T1 and T2 for some reasons. This signal from the AGC circuirt 11 is processed by the sample-and-hold circuit 15A and the low pass filter 15B of the waveform shaping circuit 15 as described in the above so that the continuous signal of FIG. 3B is obtained. On the other hand, the output signal of the sample-and-hold circuit 15A is integrated by the integrator 12 to obtain an average voltage of FIG. 3C, and this average voltage is sampled and held by the sample-and-hold circuit 13 at the timing of the sampling pulse of FIG. 3D. Namely, the average voltage is sampled at an instant just before one scanning is terminated, and held until next scanning is completed as shown in FIG. 3E. Since the amplitude of the output signal between T3 and T4 from the AGC circuit 11 is greater than that between T1 and T2, the average voltage corresponding to the former is also greater than that corresponding to the latter. The sampled and held average voltage is then converted into a negative voltage proportional to the average voltage by the control circuit 14 to be fed to the gate of the FET 11a.

As is apparent from FIG. 3E, the voltage fed to the gate of FET 11a during T3-T4 is greater than that of T1-T2 in negative direction, and therefore, the impedance between the drain and source of the FET 11a becomes higher than before to lower the gain G of the AGC circuit 11. Accordingly, the amplitude of the output signal from the AGC circuit 11 will be lowered for subsequent scanning, and thus constant amplitude signal will be obtained thereafter.

Now the operation of the circuit arrangement of FIG. 2 after the constant output has been obtained from the AGC circuit 11 will be described with reference to FIGS. 4A to 4C. FIG. 4A shows a waveform of the output signal from the low pass filter 15B, which is obtained by transmitting the output signal of the AGC circuit 11 through the sample-and-hold circuit 15A and then through the low pass filter 15B. FIG. 4B is a waveform of the reference signal produced in the comparator 16 to be fed to the operational amplifier 16d. Namely, the output signal from the low pass filter 15B is fed to the diodes 16a and 16b so that its voltage is reduced by the forward voltage drop of the diodes 16a and 16b, and its phase is shifted by the capacitor 16c to provide the reference signal which will be compared with the output signal (see dotted curve in FIG. 4B) from the low pass filter 15B. The operational amplifier 16d produces a high level output signal when the amplitude of the output signal from the low pass filter 15B is greater than the reference voltage, and a low level output signal when the former is lower than the latter. FIG. 4C shows the output signal from the operational amplifier 16d, namely, the output signal from the comparator 16. In other words, the output signal from the comparator 16 is a binary signal having a high level corresponding to the white bars of the bar code 1a and a low level corresponding to the black bars.

Another embodiment of the present invention will be described with reference to FIG. 5. As described in the above, the peak voltage of the output signal from the sample-and-hold circuit 15A may be detected rather than detecting the average voltage. Namely, the integrator 12 of FIG. 2 may be replaced with a peak detecter or a peak hold circuit 30 of FIG. 5. In the peak hold circuit 30, the peak voltage of its input signal is held by means of a diode 30a and a capacitor 30b, and the following analog switch 13a is closed in response to the sampling pulse signal so that the peak voltage is transmitted to the capacitor 13b to be held therein until next scanning. The reference 30c is a buffer of open collector type which is controlled by a clock pulse signal synchronized with the sampling pulse. The buffer 30c is arranged to discharge the capacitor 30b when the analog switch 13a is open to prepare for peak holding for next scanning.

In the above-described embodiments, although scanning of the bars of the bar code 1a is effected electronically by the image sensor 8, a laser light beam scanning type sensor which scans on the reading line by a laser light beam to convert the reflected light into discrete electrical signals, may be employed in place of the image sensor 8 as long as the sensor is of the type arranged to perform repetitive scanning.

In the above-described embodiments, although the voltage applied to the gate of the FET 11a, i.e. the average voltage or peak voltage, is derived by sampling and holding the output signal from the AGC circuit 11, the output signal of the analog amplifier 10 may be directly sampled and held to produce such an average or peak voltage.

From the foregoing description, it will be understood that the amplitude of the information signal carrying black and white bar width can be controlled constant irrespective of the variation in reflection factor throughout various kinds of bar code labels and irrespective of amplitude change for some reasons. Therefore, bar code recognition can be accurately done irrespective of the change in intensity of the illuminating light, stain on the bar code label, variation in reflection factor throughout labels.

The above-described embodiments are just examples of the present invention, and therefore, it will be apparent for those skilled in the art that many modifications and variations may be made without departing from the spirit of the present invention.

What is claimed is:

1. An optical reading apparatus for converting information which is optically readable by an image sensor into an electrical signal, comprising:
   clock generator means for generating first and second pulses, and for applying multiple of said first pulses to said image sensor to thereby enable optical reading of said information, said multiple pulses constituting a scanning operation, and for generating one of said second pulses at the completion of one of said scanning operations;
   means for producing from said image sensor said electrical signal;
   means, responsive to said generated second pulses, for sampling the voltage amplitude of said electrical signal, and for holding said sampled voltage until a next scanning operation;
   automatic gain control circuit means, responsive to said sampled voltage, for automatically controlling the amplitude of said electrical signal.

2. An optical reading apparatus as claimed in claim 1, wherein said sampling and holding means is adapted to successively sample and hold a respective average voltage of said electrical signal for each of successive scanning operations.

3. An optical reading apparatus as claimed in claim 1, wherein said sampling and holding means is adapted to successively sample and hold a respective peak voltage of said electrical signal for each of successive scanning operations.

4. An optical reading apparatus as claimed in claim 2, wherein said sampling and holding means comprises an integrator.

5. An optical reading apparatus as claimed in claim 3, wherein said sampling and holding means comprises a peak hold circuit.

6. An optical reading apparatus as claimed in claim 1, wherein said sampling and holding means comprises:
   an integrator having a resistor and a capacitor;
   a sample-and-hold circuit having an analog switch adapted to open and close in response to a clock pulse signal, and a circuit capacitor arranged so that the voltage across said capacitor of said integrator is intermittently transmitted to said circuit capacitor in accordance with operation of said analog switch; and
   a control circuit having a voltage follower providing an output signal responsive to the output voltage across said circuit capacitor, and having an inverting amplifier, responsive to the output signal from said voltage follower.

7. An optical reading apparatus as claimed in claim 1, wherein said means comprises:
   a peak detector having a diode, a capacitor and a buffer controlled by a clock pulse signal;
   a sample-and-hold circuit having an analog switch arranged to open and close in response to said clock pulse signal, and a circuit capacitor arranged so that the voltage across said capacitor of said peak detector is intermittently transmitted to said circuit capacitor in accordance with operation of said analog switch; and a control circuit having a voltage follower providing an output signal responsive to the output voltage across said circuit capacitor, and having an inverting amplifier responsive to the output signal from said voltage follower.

8. An optical reading apparatus as claimed in claim 1, wherein said automatic gain control circuit comprises an element whose impedance varies in accordance with said sampled voltage.

9. An optical reading apparatus as claimed in claim 8, wherein said element comprises a field effect transistor connected in series with a resistor.

10. An optical reading apparatus as claimed in claim 1, further comprising a waveform shaping circuit responsive to an output signal from said automatic gain control circuit, said waveform shaping circuit having a sample-and-hold circuit and a low pass filter.

11. An optical reading apparatus as claimed in claim 10, further comprising a comparator responsive to an output signal from said low pass filter, said comparator having inverse-parallel diodes and a capacitor for producing a reference voltage for comparison with the voltage of the output signal from said low pass filter.

* * * * *